United States Patent
Baker et al.

(10) Patent No.: US 7,188,165 B1
(45) Date of Patent: Mar. 6, 2007

(54) METHOD OF, AND A HETEROGENEOUS NETWORK FOR, TRANSMITTING DATA PACKETS

(75) Inventors: Matthew P. J. Baker, Canterbury (GB); Edward S. Eilley, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 575 days.

(21) Appl. No.: 09/580,167

(22) Filed: May 30, 2000

(30) Foreign Application Priority Data

Jun. 8, 1999 (GB) .................................. 9913260.7

(51) Int. Cl.
*G06F 15/173* (2006.01)

(52) U.S. Cl. .................. 709/222; 709/223; 709/236; 370/235; 370/236

(58) Field of Classification Search ................ 709/232, 709/222, 223; 370/236, 235
See application file for complete search history.

(56) References Cited

U.S. PATENT DOCUMENTS

| H001641 H | * | 4/1997 | Sharman ....................... 379/60 |
| 5,621,660 A | * | 4/1997 | Chaddha et al. ............. 364/514 |
| 6,321,260 B1 | * | 11/2001 | Takeuchi et al. ............. 709/223 |
| 6,404,739 B1 | * | 6/2002 | Gonno ........................ 370/236 |

* cited by examiner

*Primary Examiner*—Jason Cardone
*Assistant Examiner*—Adnan M. Mirza

(57) ABSTRACT

A method of transmitting data packets in a heterogeneous network comprising first and second parts (10, 18) and an interface between the parts, comprises a device (16) in the first part (10) or interface determining the number of data packets being transmitted in a predetermined time and reserving sufficient information carrying capacity in the second part (18) corresponding to at least one data packet in excess of the number determined.

20 Claims, 2 Drawing Sheets

METHOD OF, AND A HETEROGENEOUS NETWORK FOR, TRANSMITTING DATA PACKETS

The present invention relates to a method of, and heterogeneous network for, transmitting data packets over an interface between a first network part and a second network part.

Various protocols are known for handling data packets. The IEEE 1394 protocol relating to high performance serial bus operates using regular cycles of 125 μs. Each cycle typically comprises 100 μs of isochronous data and 25 μs of asynchronous data.

Constant average bit rate isochronous services, such as MPEG, produce a stream of data to be transmitted. The data is divided into data blocks of a constant size. When using the IEEE 1394 protocol in conjunction with MPEG in a heterogeneous network a problem which frequently occurs is that the rate of arrival of the constant size data blocks will not necessarily correspond to the cycle rate on a IEEE 1394 bus. In contrast a device which reserves bandwidth, that is information carrying capacity, for the service on a IEEE 1394 bus has to reserve sufficient bandwidth for the greatest number of such data blocks which will ever have to be transmitted in one 125 μs cycle.

The number of data blocks transmitted in each cycle may not be constant, if a non-integer value results from the quotient:

$$\frac{(\text{Required information rate}) \times (\text{Cycle Duration})}{(\text{Data Block Size})}$$

By way of example if the result of the above quotient is 1.01, that is non-integer, it will be necessary to send one data block in each of 99 consecutive cycles, followed by 2 data blocks in the one hundredth cycle.

In order to allow for the cycle which will contain 2 data blocks, sufficient bandwidth has to be reserved for 2 data blocks to be transmitted in every cycle, thus wasting 49.5% of the bandwidth reserved.

This presents particular problems in heterogeneous networks, where the amount of bandwidth reserved in one part of the network may be taken as a measure of the amount of bandwidth required to be reserved in a second part of the network over which the same service is to be transmitted. This may result in excess bandwidth being unnecessarily reserved in the second part of the network. This is especially undesirable if bandwidth is particularly scarce in the second part of the network, for example if it uses wireless technology.

An object of the present invention is to use bandwidth more effectively in heterogeneous networks.

According to one aspect of the present invention there is provided a method of transmitting data packets over an interface between first and second heterogeneous parts, comprising the first part or interface determining the number of data packets being transmitted in a predetermined time and reserving sufficient information carrying capacity in the second part corresponding to at least one data packet in excess of the number determined.

According to a second aspect of the present invention there is provided a heterogeneous network comprising first and second heterogeneous parts, and an interface between the said parts, the first part having means for transmitting data packets and the first part or interface having means for determining the number of data packets being transmitted in a predetermined time, and the second part having means for receiving the data packets transmitted by the first part and means for reserving sufficient information carrying capacity corresponding to at least one data packet in excess of the number determined.

The method in accordance with the present invention enables sufficient information carrying capacity to be reserved in the second part of the network to ensure that the data blocks from a constant average bit rate service are always able to be transmitted. Further the amount of information carrying capacity reserved in the second part of the network may be reduced during transmission of the service.

In one embodiment of the method in accordance with the present invention at the commencement of transmission the amount of information carrying capacity reserved in the second part corresponds to that reserved in the first part and the amount of information carrying capacity reserved is reduced during transmission to at least one packet in excess of the number determined.

The present invention will now be described, by way of example, with reference to the accompanying drawings, wherein.

In the drawings the same reference numerals have been used to indicate corresponding features.

Figure 1:
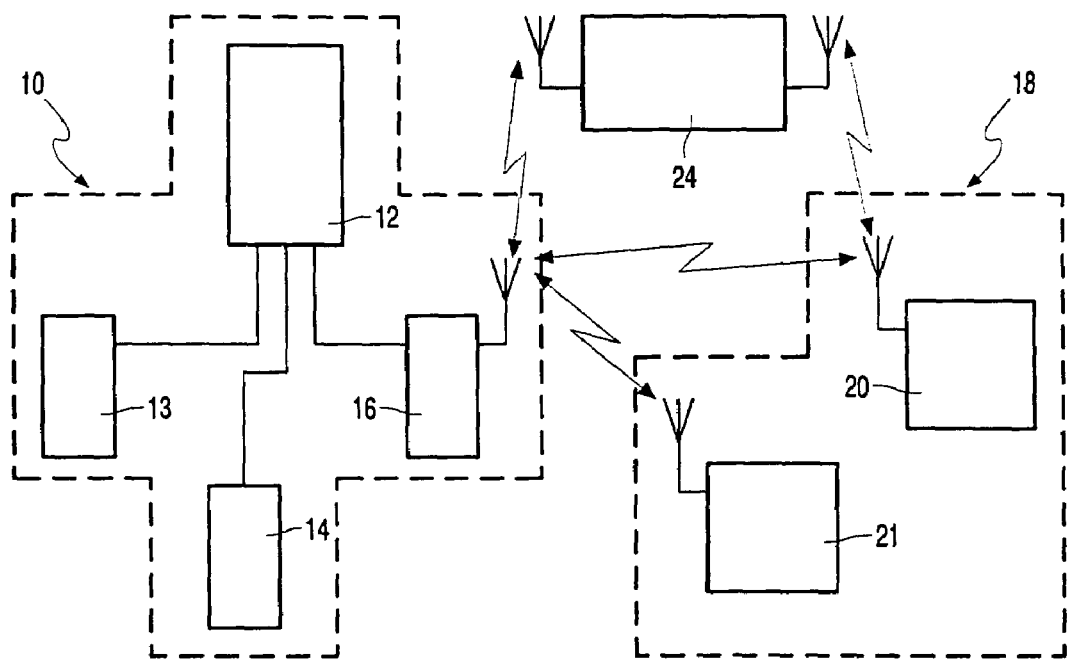
FIG. 1 is a block schematic diagram of a heterogeneous network.

The heterogeneous network shown in FIG. 1 comprises a first wired part 10 consisting of one or more devices 12, 13, 14, such as source(s) of video information for example video cameras and video recorders, and a transceiving device 16 and a second wireless part 18 comprising devices 20, 21, such as television receivers. The network may also comprise a central controller 24 which is involved in communicating directly with the devices 16, 20, 21, and by way of the device 16 with the wired devices 12, 13 and 14, prior to direct mode communication between the devices in the parts 10 and 18 in time slots allocated by the central controller 24. For convenience of description the first part 10 operates in accordance with the IEEE 1394 protocol and the second part 18 operates in accordance with the Hiperlan protocol.

Figure 2:
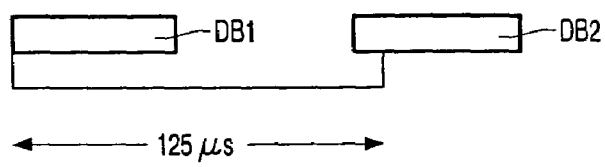
FIG. 2 illustrates a cycle of 125 μs and data blocks to be transmitted.

In operation it is assumed that the device 12, for example a video source, in the wired part 10 wishes to establish an isochronous connection with the device 20 in the wireless part 18. The first wired part 10 operates using a protocol which is packet- and cycle-based such as IEEE 1394. Information carrying capacity, generally termed bandwidth, corresponding to the greatest number of data blocks DB which will have to be transmitted by the device 16 in a cycle having in this example a duration of 125 μs, is reserved on the first part of the network. The device 16 which is responsible for reserving the bandwidth in the second part 18 of the network initially reserves the same amount of bandwidth as was reserved on the first part 10 of the network. Thus for example as shown in FIG. 2, a cycle comprises data block DB1 and a fraction of one fifth of the data block DB2 causing enough bandwidth to be reserved in the first part 10 of the network for two data blocks per cycle and causing the device 16 to reserve likewise enough bandwidth in the second part 18 of the network for two data blocks per 250 μs.

However when the service begins, the device 16 counts the number N of data blocks DB10 to DB13(FIG. 3) arriving in the time T1 from the first part 10 of the network. The device reduces the bandwidth allocation to correspond to (N+1) data blocks per time period T1. The device 16 communicates with the central controller 24 to free up an amount of bandwidth in the second part 18 of the network equal to the difference between the amount of bandwidth initially reserved and $$\frac{((\text{Number of data blocks received in time from 1st. part of network}) + 1) \times (\text{Size of Data Block})}{T1}$$

Figure 3:
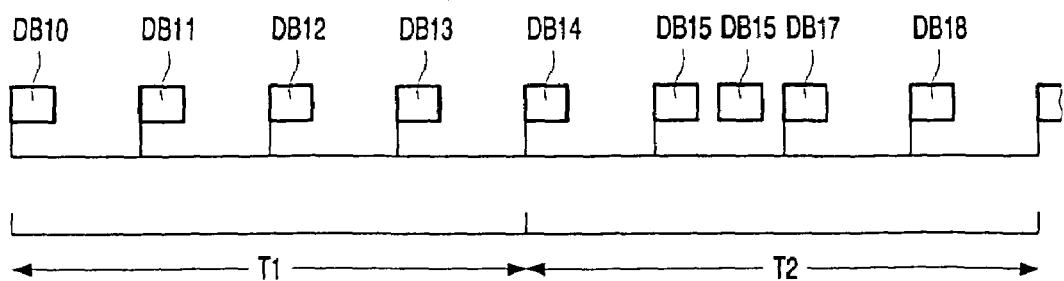
FIG. 3 illustrates the transmission of data blocks.

Thus sufficient bandwidth is always reserved in the second part 18 of the network for one more than the lowest number of data blocks received from the first part 10 of the network in time T1, thereby saving a large amount of extra bandwidth. In FIG. 3, four data blocks DB10, DB11, DB12 and DB13 are received in the time period T1 but in the second time period T2, where T2 is equal to T1, there are five data blocks DB14 to DB18 which require the entire reserved bandwidth.

Figure 4:
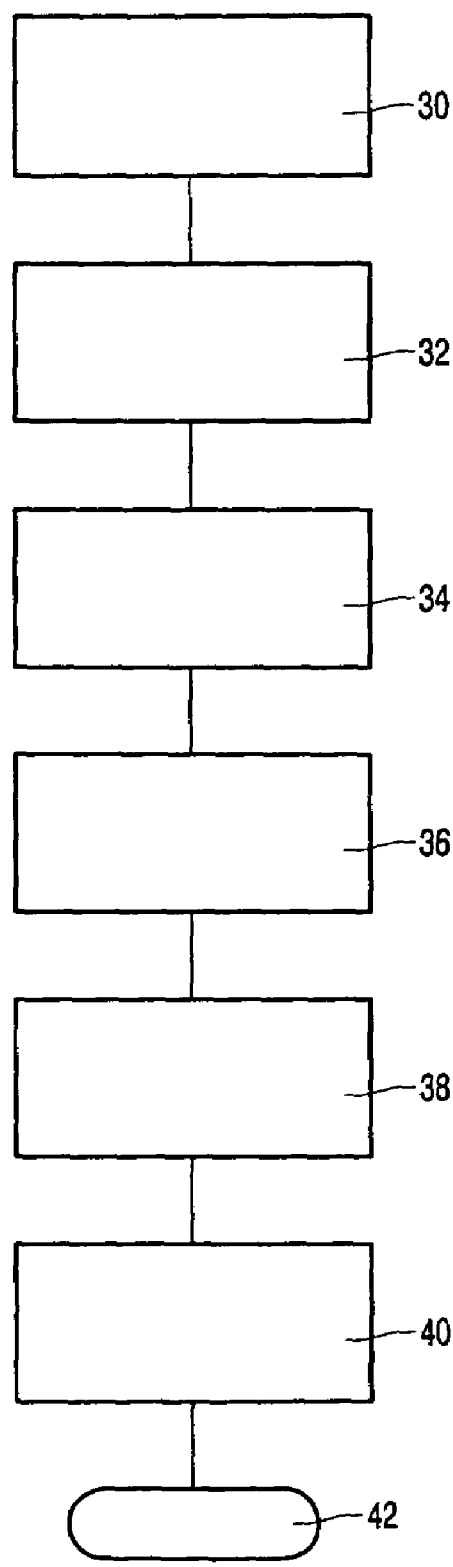
FIG. 4 is a flow chart illustrating the sequence of operations.

Referring to FIG. 4, the flow chart starts with block 30 denoting the device 16 signalling to the central controller 24 that it wants to transmit to say the device 20 in the second part 18. Block 32 indicates reserving in the second part 18 bandwidth equivalent to that reserved in the first part 10. Block 34 relates to the commencement of transmission of data blocks by the device 16. Block 36 relates to the device 16 counting the number of data blocks in successive time periods having a duration T1. Block 38 relates to the device 16 determining the bandwidth (N+1) to be reserved by the second part 18. Block 40 denotes the excess bandwidth being released for use by other users of the network. Block 42 denotes the end of the process.

In the case of a heterogeneous network in which the predetermined time T1 is not synchronised to the cycles in the first part of the network it may be necessary for the device 16 to allocate bandwidth corresponding to (N+2) data blocks per time period.

Although the present invention has for convenience been described with reference to IEEE 1394 and Hiperlan, the principle can be used with other heterogeneous systems establishing an isochronous connection between two parts.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of heterogeneous networks and components therefor and which may be used instead of or in addition to features already described herein.

The invention claimed is:

1. A method of transmitting data packets over an interface between first and second heterogeneous parts, the method comprising the steps of:

after transmission of the data packets begins, determining, in the first part or interface, a number of data packets being transmitted in a predetermined time; and reserving, in the second part, sufficient information carrying capacity, corresponding to at least one data packet in excess of the number determined, wherein said transmission occurs in consecutive cycles, said at least one amounting to a quantity that differs depending upon whether said predetermined time is synchronized to said cycles.

2. A method as claimed in claim 1, wherein at the commencement of transmission an amount of information carrying capacity reserved in the second part corresponds to that reserved in the first part, and wherein the amount of information carrying capacity reserved is reduced during transmission to at least one packet in excess of the number determined.

3. A heterogeneous network comprising:

a first and a second heterogeneous parts; and an interface between the said parts, wherein the first part has means for transmitting data packets and the first part or interface has means for, after transmission of the data packets begins, determining a number of data packets being transmitted in a predetermined time, and the second part has means for receiving the data packets transmitted by the first part and means for reserving sufficient information carrying capacity corresponding to at least one data packet in excess of the number determined, wherein said transmission occurs in consecutive cycles, said at least one amounting to a quantity that differs depending upon whether said predetermined time is synchronized to said cycles.

4. A heterogeneous network as claimed in claim 3, wherein said means for reserving initially reserves in the second part the same amount of information carrying capacity as is reserved in the first part and is responsive to signals indicating the number of data packets being transmitted for reducing the amount of information carrying capacity to at least one data packet in excess of the number determined.

5. The method of claim 1, wherein, for a buffer of said first part over at least one time period whose duration equals that of said predetermined time, said cycles fill said buffer faster than said buffer is emptied in transmitting to said second part, and wherein, for at least one other time period whose duration equals that of said predetermined time, said cycles fill said buffer slower than said buffer is emptied in transmitting to said second part, said determining and said reserving being performed both for said at least one time period as said predetermined time period and for a consecutively following time period as said predetermined time period.

6. The method of claim 1, wherein transmission delivers, to said first part, more than one of said data packets per cycle and sends, from said first part to said second part, an integral number of said data packets per cycle.

7. The method of claim 6, wherein said more than one entails part of data packet so that said more than one amounts to a non-integral number of said data packets.

8. The method of claim 1, wherein said data packets are of equal size, and said reserving comprises multiplying a sum of said number and one by said size if said predetermined time is synchronized to said cycles.

9. The method of claim 1, wherein said data packets are of equal size, and said reserving comprises multiplying a sum of said number and two by said size if said predetermined time is not synchronized to said cycles.

10. The method of claim 1, wherein said quantity is one if said predetermined time is synchronized to said cycles.

11. The method of claim 1, wherein said quantity if two if said predetermined time is not synchronized to said cycles.

12. The network of claim 3, wherein, for a buffer of said first part over at least one time period whose duration equals that of said predetermined time, said cycles fill said buffer faster than said buffer is emptied in transmitting to said second part, and wherein, for at least one other time period whose duration equals that of said predetermined time, said cycles fill said buffer slower than said buffer is emptied in transmitting to said second part, said determining and said reserving being performed both for said at least one time period as said predetermined time period and for a consecutively following time period as said predetermined time period.

13. The network of claim 3, wherein transmission delivers, to said first part, more than one of said data packets per cycle and sends, from said first part to said second part, an integral number of said data packets per cycle.

14. The network of claim 13, wherein said more than one entails part of data packet so that said more than one amounts to a non-integral number of said data packets.

15. The network of claim 3, wherein said data packets are of equal size, and said reserving comprises multiplying a sum of said number and one by said size if said predetermined time is synchronized to said cycles.

16. The network of claim 3, wherein said data packets are of equal size, and said reserving comprises multiplying a sum of said number and two by said size if said predetermined time is not synchronized to said cycles.

17. The network of claim 3, wherein said quantity is one if said predetermined time is synchronized to said cycles.

18. The network of claim 3, wherein said quantity if two if said predetermined time is not synchronized to said cycles.

19. A network comprising:
a first and a second parts; and
an interface between the said parts,
wherein the first part has a transmitter for transmitting data packets and the first part or interface is configured for, after transmission of the data packets begins, determining a number of data packets being transmitted in a predetermined time, and the second part is configured for receiving the data packets transmitted by the first part and for reserving sufficient information carrying capacity corresponding to at least one data packet in excess of the number determined, wherein said transmission occurs in consecutive cycles, said at least one amounting to one if said predetermined time is synchronized to said cycles, and amounting to two if said predetermined time is not synchronized to said cycles.

20. The network of claim 19, wherein transmission delivers, to said first part, more than one of said data packets per cycle and sends, from said first part to said second part an integral number of said data packets per cycle.

* * * * *